(12) United States Patent
Yang

(10) Patent No.: US 12,467,579 B2
(45) Date of Patent: Nov. 11, 2025

(54) CLIP AND PHOTOGRAPHY KIT

(71) Applicant: SHENZHEN NEEWER TECHNOLOGY CO. LTD, Shenzhen (CN)

(72) Inventor: Faan Yang, Shenzhen (CN)

(73) Assignee: SHENZHEN NEEWER TECHNOLOGY CO., LTD, Shenzhen (CN)

( * ) Notice: Subject to any disclaimer, the term of this patent is extended or adjusted under 35 U.S.C. 154(b) by 83 days.

(21) Appl. No.: 18/610,661

(22) Filed: Mar. 20, 2024

(65) Prior Publication Data

US 2025/0271095 A1 Aug. 28, 2025

(30) Foreign Application Priority Data

Feb. 22, 2024 (CN) .......................... 202420334154.3

(51) Int. Cl.
| | |
|---|---|
| *F16M 11/04* | (2006.01) |
| *F16B 2/06* | (2006.01) |
| *G03B 17/56* | (2021.01) |

(52) U.S. Cl.
CPC ............... *F16M 11/04* (2013.01); *F16B 2/06* (2013.01); *G03B 17/56* (2013.01)

(58) Field of Classification Search
CPC ............ F16M 11/04; F16B 2/06; G03B 17/56
See application file for complete search history.

(56) References Cited

U.S. PATENT DOCUMENTS

| D1,009,012 | S | * | 12/2023 | Wang | ........................... D16/242 |
| D1,026,073 | S | * | 5/2024 | Chen | ........................... D16/242 |
| D1,074,659 | S | * | 5/2025 | Shan | ........................... D16/242 |

(Continued)

FOREIGN PATENT DOCUMENTS

| CN | 214446507 U | * | 10/2021 | |
| CN | 216408348 U | * | 4/2022 | ........... G03B 17/566 |
| WO | WO-2018209772 A1 | * | 11/2018 | ............. F16M 13/04 |

OTHER PUBLICATIONS

Neewer quick release side handle for phone cage item model No. 10103678 sold on amazon.com, dated Feb. 1, 2024, https://www.amazon.com/NEEWER-Release-Samsung-Covered-PA045B/dp/B0CTQSJXBQ?th=1 (Year: 2024).*

(Continued)

*Primary Examiner* — Terrell L Mckinnon
*Assistant Examiner* — Ding Y Tan
(74) *Attorney, Agent, or Firm* — Westbridge IP LLC

(57) ABSTRACT

Disclosed are a clip and a photography kit. The clip includes: a seat, a pressing plate and a rotation assembly. One end of the seat is a fixed clamping portion; the pressing plate rotatably is provided on the seat, one end of the pressing plate is a movable clamping portion, the pressing plate is provided with a protruding inclined surface, the protruding inclined surface has a highest point and a lowest point, and a continuous inclined surface is provided between the lowest point and the highest point of the protruding inclined surface. The rotation assembly is abutted against the protruding inclined surface through rotation. The fixed clamping portion is cooperated with the movable clamping portion to form a clamping slot, and the pressing plate is configured to rotate on the seat to open or close the clamping slot.

13 Claims, 12 Drawing Sheets

(56) References Cited

U.S. PATENT DOCUMENTS

2024/0411212 A1* 12/2024 Zhou ............... G03B 17/566
2024/0411213 A1* 12/2024 Jiang ............... G03B 17/563

OTHER PUBLICATIONS

Neewer quick release side handle for phone cage item model No. 10103677 sold on amazon.com, dated Jan. 26, 2024, https://www.amazon.com/NEEWER-Release-Samsung-Covered-PA045S/dp/B0CTCVGT36?th=1 (Year: 2024).*

Smallrig universal side handle grip for DSLR camera cage model No. 2187-SR sold on amazon.com dated Jul. 31, 2018, https://www.amazon.com/SMALLRIG-Universal-Wooden-Handle-Threaded/dp/B07G2BQ8F1 (Year: 2018).*

\* cited by examiner

CLIP AND PHOTOGRAPHY KIT

CROSS-REFERENCE TO RELATED APPLICATIONS

The present application claims priority to Chinese Patent Application No. 202420334154.3, filed on Feb. 22, 2024, the entire contents of which are incorporated herein by reference.

TECHNICAL FIELD

The present application relates to the technical field of photographic equipment, and in particular to a clip and a photography kit.

BACKGROUND

At present, the photography kit includes a clip and a handle, and the clip in the related art generally does not have the design of the self-locking function. When the clip clamps the rabbit cage that is accommodated with a mobile phone and people use the mobile phone to take pictures or record videos, the fingers are easy to touch and open the clip by mistake, so that the rabbit cage and the mobile phone installed in the rabbit cage may move or even fall because of losing the grip of the clip, that is, the current clip lacks the self-locking function, resulting in a problem of a low clamping security of the clip.

SUMMARY

The main purpose of the present application is to provide a clip, aiming to improve the clamping security of the clip.

In order to achieve the above purpose, the clip provided in the present application includes: a seat, a pressing plate and a rotation assembly; one end of the seat is a fixed clamping portion; the pressing plate rotatably is provided on the seat, one end of the pressing plate is a movable clamping portion, the pressing plate is provided with a protruding inclined surface, the protruding inclined surface has a highest point and a lowest point, and a continuous inclined surface is provided between the lowest point and the highest point of the protruding inclined surface; and the rotation assembly is abutted against the protruding inclined surface through rotation; the fixed clamping portion is cooperated with the movable clamping portion to form a clamping slot, and the pressing plate is configured to rotate on the seat to open or close the clamping slot; in response to that the clamping slot is closed and the rotation assembly is abutted against the protruding inclined surface through rotation, the movable clamping portion is configured to move towards the fixed clamping portion, and the movable clamping portion is pressed to lock the clip.

In an embodiment, the pressing plate is provided with a long through hole, a length of the long through hole extends towards the movable clamping portion, the rotation assembly is installed on the seat through the long through hole, and a rotation axis of the pressing plate is perpendicular to an extension direction of the long through hole.

In an embodiment, the rotation assembly includes: a fixed column and a knob, the fixed column is installed on the seat through the long through hole; and an abutting arm is provided on a circumferential direction of the knob, and the knob is configured to rotate to make the abutting arm be abutted against the protruding inclined surface.

In an embodiment, the rotation assembly further includes two limiting members, the two limiting members are provided on the fixed column and are arranged at intervals, the knob is installed on the fixed column and is provided between the two limiting members, and each limiting member is an elastic pad.

In an embodiment, a diameter of the long through hole is greater than a diameter of the fixed column.

In an embodiment, an extending arm is provided on the circumferential direction of the knob, the extending arm is spaced apart from the abutting arm, and the extending arm is spaced apart from the protruding inclined surface at height.

In an embodiment, the pressing plate is provided with a limiting baffle configured for blocking the abutting arm to limit a rotation of the knob, and the extending arm is spaced apart from the limiting baffle at height.

In an embodiment, the pressing plate is rotatably connected to the seat through a rotation shaft, and the pressing plate is configured to rotate along the rotation shaft to drive the movable clamping portion to rotate, so as to open the clamping slot.

In an embodiment, one side of the seat close to the pressing plate is provided with a cavity, an elastic member is provided in the cavity, one end of the elastic member is abutted against the seat, the other end of the elastic member is abutted against the pressing plate, and the elastic member and the movable clamping portion are provided on two sides of the rotation shaft.

In an embodiment, one side of the pressing plate away from the seat is provided with a pressing structure, and the pressing structure and the movable clamping portion are respectively provided at the two sides of the rotation shaft.

In an embodiment, two rotation shafts are provided, and the two rotation shafts are in a same straight line and are arranged relative to two sides of the pressing plate.

In an embodiment, the protruding inclined surface includes: an inclined surface and a spiral surface, the inclined surface is a continuous straight inclined surface, and the inclined surface has a lowest point and a highest point; and the spiral surface is a continuous arc inclined surface, and a lowest point of the spiral surface is smoothly connected to the highest point of the inclined surface.

The present application also provides a photography kit, including a handle and the clip, and the clip is installed on the handle.

In the present application, the clip includes a seat, a pressing plate and a rotation assembly, one end of the seat is a fixed clamping portion, the pressing plate is installed on the seat, and one end of the pressing plate is a movable clamping portion. The pressing plate is provided with a protruding inclined surface having the highest point and the lowest point, and a continuous inclined surface is provided between the lowest point and the highest point of the protruding inclined surface. The rotation assembly is abutted against the protruding inclined surface through rotation, and the fixed clamping portion is cooperated with the movable clamping portion to form the clamping slot. When the rotation assembly is abutted against the protruding inclined surface through rotation, the rotation assembly resists the pressing plate and exerts a pressure on the pressing plate, so that the pressing plate is squeezed by the rotation assembly and the movable clamping portion moves towards the fixed clamping portion, making the clamping force of the clamping slot larger and tighter. At the same time, the pressing plate has a pressure reaction force on the rotation assembly, which makes the rotation assembly not easy to be rotated at this time, and the rotation assembly can be relatively stable in this position, so as to realize the locking of the clip and improve the clamping security of the clip.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

Figure 1:
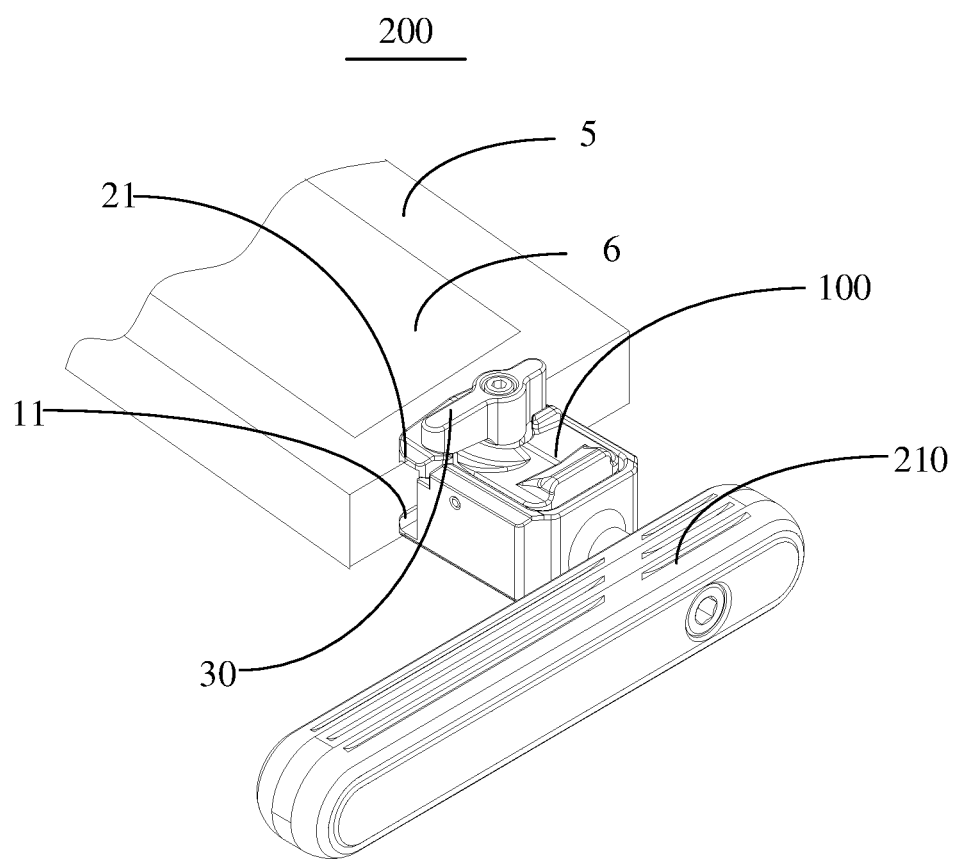
FIG. 1 is a schematic structural view of a photography kit according to an embodiment of the present application.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by persons skilled in the art based on the embodiments of the present application without creative efforts shall fall within the scope of the present application.

It should be noted that all directional indications (such as up, down, left, right, front, back, etc.) in the embodiments of the present application are only used to explain the relative positional relationship, the movement situation, etc. among various assemblies under a certain posture as shown in the drawings. If the specific posture changes, the directional indication also changes accordingly.

In addition, the descriptions of "first", "second", etc. are only for the purpose of description, and should not be construed as indicating or implying relative importance or implicitly indicating the number of technical features indicated. Thus, a feature delimited with "first", "second" may expressly or implicitly include at least one of that feature. Besides, the meaning of "and/or" appearing in the application includes three parallel scenarios. For example, "A and/or B" includes only A, or only B, or both A and B. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

The present application provides a clip 100, aiming to improve the clamping security of the clip 100.

Figure 2:
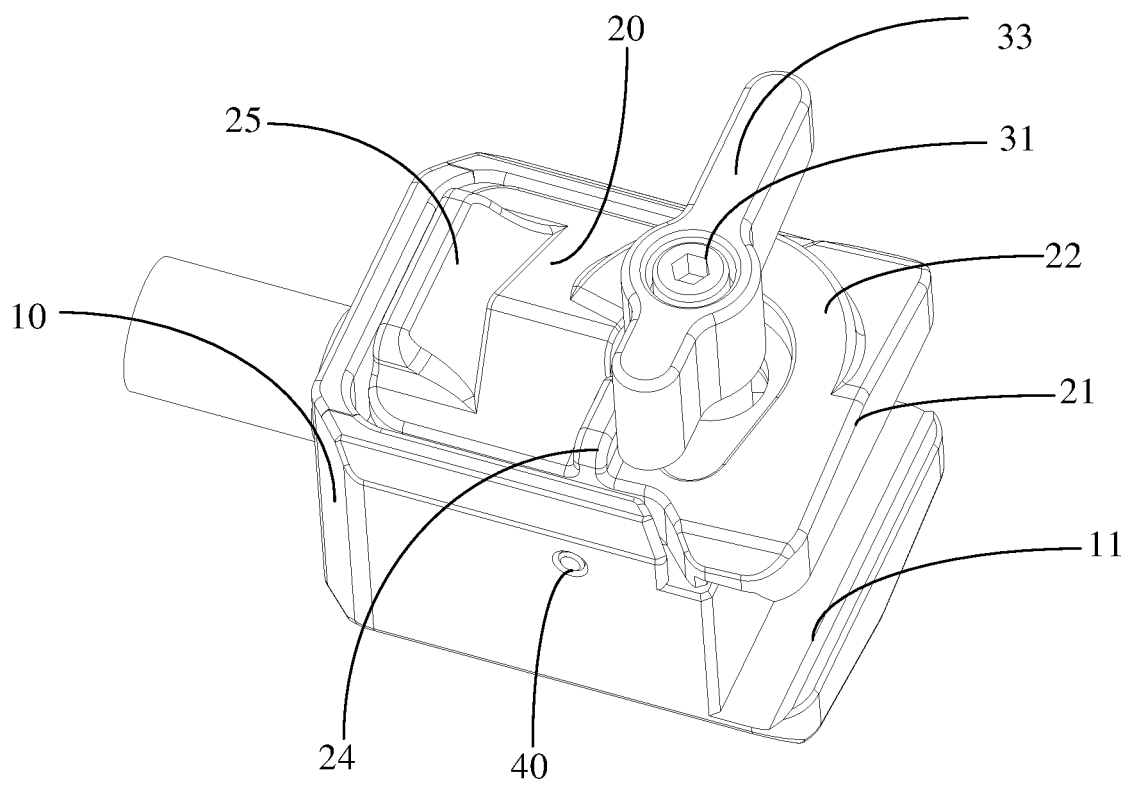
FIG. 2 is a schematic structural view of a clip according to an embodiment of the present application.

In an embodiment of the present application, with reference to FIG. 1 to FIG. 2, the clip 100 includes a seat 10, a pressing plate 20 and a rotation assembly 30. One end of the seat 10 is a fixed clamping portion 11, and the pressing plate 20 is rotatably installed at the seat 10. One end of the pressing plate 20 is a movable clamping portion 21, and the pressing plate 20 is provided with a protruding inclined surface 22 having a highest point and a lowest point. A continuous inclined surface is provided between the highest point and the lowest point of the protruding inclined surface 22, and the rotation assembly 30 is abutted against the protruding inclined surface 22 through rotation. The fixed clamping portion 11 is cooperated with the movable clamping portion 21 to form a clamping slot, and the pressing plate 20 rotates on the seat 10 to open the clamping slot. When the clamping slot is closed and the rotation assembly 30 is abutted against the protruding inclined surface 22 through rotation, the movable clamping portion 21 moves towards the fixed clamping portion 11 and presses the movable clamping portion 21 to lock the clip 100.

It should be understood that the fixed clamping portion 11 is fixed on the seat 10, and the movable clamping portion 21 is fixed on the pressing plate 20. There is a gap between the pressing plate 20 and the seat 10, and the pressing plate 20 can be driven to move towards the seat 10 by applying a force to the pressing plate 20 towards the seat 10, so as to drive the movable clamping portion 21 to move towards the fixed clamping portion 11, so that the space of the clamping slot is compressed, and the clamped mobile phone 6 is locked. The rotation assembly 30 can be abutted against the protruding inclined surface 22 through rotation. When the rotation assembly 30 is abutted against the protruding inclined surface 22, the rotation assembly 30 applies pressure towards the seat 10 to the pressing plate 20, and the pressing plate 20 applies a reaction force to the rotation assembly 30, thus the abutting force between the rotation assembly 30 and the protruding inclined surface 22 increases, and the static friction between the rotation assembly 30 and protruding inclined surface 22 increases. The rotation assembly 30 will not easily slide off from the highest point of the protruding inclined surface 22, so as to clamp and lock the clip 100.

In an embodiment, the rotation assembly 30 is a knob 33 with a rotation arm, and the knob 33 rotates to drive the rotation arm to rotate around its center. The rotation arm can be abutted against the protruding inclined surface 22 after being rotated. The rotation arm continuously applies pressure to the protruding inclined surface 22 during the rotation process, so that the movable clamping portion 21 moves towards the fixed clamping portion 11, thereby reducing the space of the clamping slot, thus achieving the self-locking effect of the clip 100.

In an embodiment, the height of the rotation assembly 30 is fixed, that is, the rotation assembly 30 can only rotate at one horizontal height. Since the continuous inclined surface is between the lowest point and the highest point of the protruding inclined surface 22, when rotating at the fixed height, the rotation assembly 30 will be abutted against a certain point of the protruding inclined surface 22. When abutted against the protruding inclined surface 22, the rotation assembly 30 applies pressure to the pressing plate 20 and drives the movable clamping portion 21 to move towards the fixed clamping portion 11 to achieve the self-locking of the clip 100.

In an embodiment, the height of the rotation assembly 30 is not fixed, and the rotation assembly 30 may be a screw. When the rotation assembly 30 rotates in one direction, it can move toward the pressing plate 20, and when the rotation assembly 30 rotates in another direction, it can move away from the pressing plate 20. In this way, the rotation assembly 30 can rotate to move towards the pressing plate 20 and be abutted against the protruding inclined surface 22, so that the rotation assembly 30 can apply pressure to the pressing plate 20 to achieve the self-locking of the clip 100.

Further, referring to FIG. 1 to FIG. 4, in an embodiment, the pressing plate 20 is provided with a long through hole 23, the length of the long through hole 23 extends towards the movable clamping portion 21, the rotation assembly 30 is installed at the seat 10 through the long through hole 23, and the rotation axis of the pressing plate 20 is perpendicular to the extension direction of the long through hole 23.

In this way, the long through hole 23 is provided on the pressing plate 20, and the rotation assembly 30 can be installed on the seat 10 through the long through hole 23, so that when the rotation assembly 30 applies pressure to the pressing plate 20, and the length of the long through hole 23 extends towards the movable clamping portion 21. In this way, the pressing plate 20 does not easily touch the fixed column 31 when rotating, and the reaction force of the pressing plate 20 to the rotation assembly 30 can be transferred to the seat 10 through the seat 10, so that the rotation assembly 30 can be more stable at one height, avoiding the deviation of the height of the rotation assembly 30 and affecting the self-locking function of the clip 100.

In an embodiment, one side of the seat 10 close to the pressing plate 20 is provided with an installation column, and the rotation shaft 40 of the rotation assembly 30 breaks through the long through hole 23 and is inserted on the installation column, which is similar to nailing. The interference fit between the installation column and the rotation shaft 40 makes it easier to install the rotation assembly 30 on the seat 10, which also prevents the rotation assembly 30 from displacing too much in height, further improving the self-locking performance of the clip 100.

Figure 4:
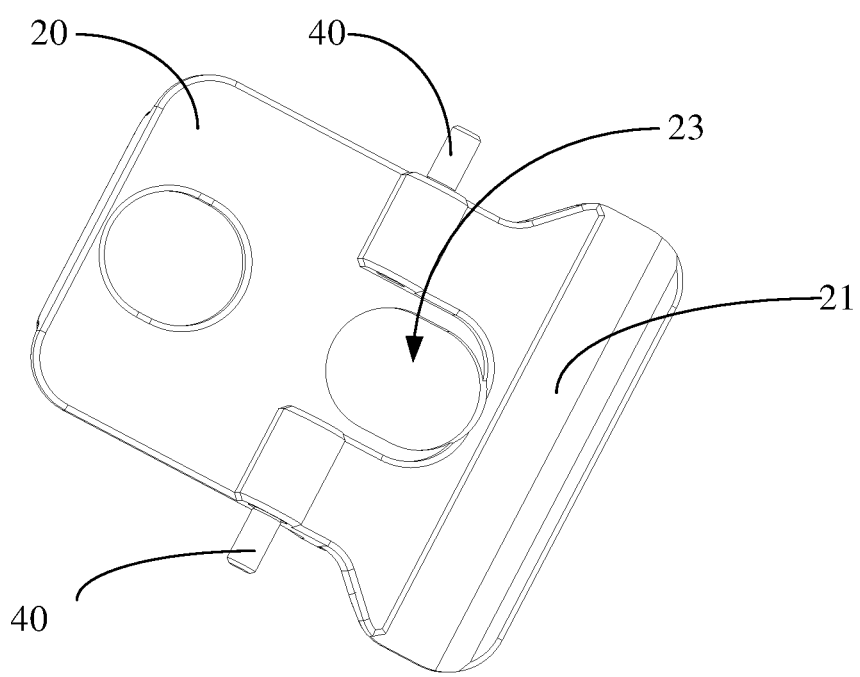
FIG. 4 is a schematic structural view of a pressing plate according to an embodiment of the present application.
Figure 5:
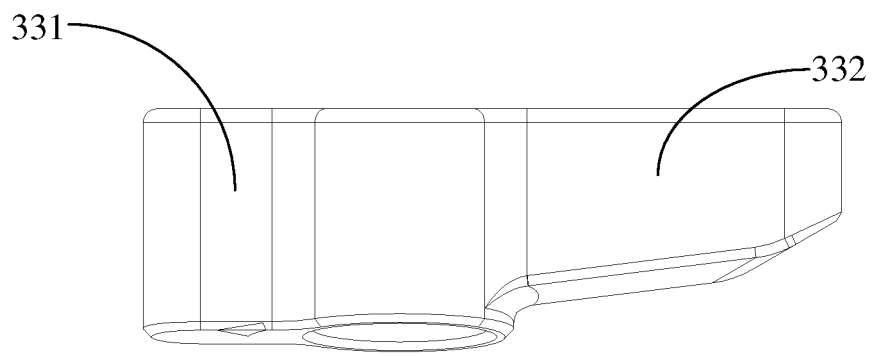
FIG. 5 is a schematic structural view of a knob according to an embodiment of the present application.

In an embodiment, referring to FIG. 4, the long through hole 23 can be with shapes such as annular groove or ellipse, so that it is relatively easy to process the long through hole 23 on the pressing plate 20, the processing cost of the pressing plate 20 is reduced, and the annular groove or elliptical shape can also provide a larger avoidance area of the long through hole 23. The fixed column 31 interferes with the edge of the long through hole 23.

Further, referring to FIG. 1 to FIG. 5, in an embodiment, the rotation assembly 30 includes a fixed column 31 and a knob 33. The fixed column 31 is installed at the seat 10 through the long through hole 23, an abutting arm 331 is arranged in a circumferential direction of the knob 33, and the knob 33 is configured to rotate to make the abutting arm 331 be abutted against the protruding inclined surface 22.

It should be understood that the fixed column 31 is inserted on the seat 10 through the long through hole 23, and the knob 33 rotates with the fixed column 31 as the rotation shaft 40, so that when the pressing plate 20 rotates on the seat 10, the fixed column 31 will not easily interfere with the edge of long through hole 23.

In an embodiment, the length of the abutting arm 331 is less than the maximum radius of the protruding inclined surface 22 but greater than the minimum radius, so that the abutting arm 331 falls exactly on the protruding inclined surface 22 after rotation, so as to avoid the outline of the entire clip 100 being affected due to the excessive length of the abutting arm 331, and avoid the problem that the abutting arm 331 is too short to be abutted against the protruding inclined surface 22.

Further, referring to FIG. 1 to FIG. 4, in an embodiment, the rotation assembly 30 further includes a limiting member 32, and two limiting members 32 are provided on the fixed column 31 and spaced apart. The knob 33 is installed on the fixed column 31 and is located between the two limiting members 32, and the limiting member 32 is an elastic pad.

In this way, the two limiting members 32 are provided on the fixed column 31, and the two limiting members 32 are abutted against the upper and lower ends of the knob 33 to limit the displacement of the knob 33 on the height of the fixed column 31, and prevent the gap after the knob 33 is installed on the fixed column 31 due to processing and assembly, that is, the knob 33 cannot be channeled in the axial direction of the fixed column 31, so as to avoid the excessive channeling momentum of the knob 33 in the axial direction of the fixed column 31, which may otherwise cause the extrusion effect of the pressing plate 20 to deteriorate, and affects the self-locking effect of the clip 100.

In an embodiment, in order to facilitate the installation and adjustment of the two limiting members 32 on the fixed column 31, the limiting member 32 adopts an elastic material, so that the limiting member 32 can be installed on the fixed column 31 through the elastic performance, and its elastic performance can also absorb the gap that occurs due to the processing and assembly of the knob 33, which further improve the self-locking performance of the clip 100.

Further, referring to FIG. 1 to FIG. 4, in an embodiment, the diameter of the long through hole 23 is greater than the diameter of the fixed column 31.

In this way, when the pressing plate 20 rotates on the seat 10, the long through hole 23 does not interfere with the fixed column 31 due to the rotation of the pressing plate 20.

In an embodiment, in order to prevent the long through hole 23 interfere with the fixed column 31 when the rotation angle of the pressing plate 20 is relatively large, the long through hole 23 adopts an elliptical hole or a long strip-shaped round hole, and the long axis direction of the long through hole 23 is perpendicular to the direction of rotation shaft of the pressing plate 20, so that there is large gap between the long through hole 23 and the fixed column 31. Even if the rotation angle of the pressing plate 20 is too large, it will not interfere with the fixed column 31. At the same time, the area can be smaller than the round hole, so as to avoid more dust, garbage, etc. falling into the seat 10.

Further, referring to FIG. 1 to FIG. 5, in an embodiment, an extending arm 332 is provided on a circumferential direction of the knob 33. The extending arm 332 is spaced apart from the abutting arm 331, and the extending arm 332 is spaced apart from the protruding inclined surface 22 at height.

In this way, the extending arm 332 is provided on the knob 33, the length of the extending arm 332 is longer than the length of the abutting arm 331, so that when the knob 33 rotates, the force acting on the tail end of the extending arm 332 can be more labor-saving, which is convenient for the user to operate the knob 33. At the same time, the extending arm 332 is spaced apart from the protruding inclined surface 22 at height to prevent from interfering with the protruding inclined surface 22 when the knob 33 rotates, which may otherwise affect the knob 33 to rotate further.

In an embodiment, the angle between the extending arm 332 and the abutting arm 331 is at 180°, that is, the extending arm 332 and the abutting arm 331 are in a same straight line, so that the angle between the extending arm 332 and the abutting arm 331 is prevented from being too small to operate the extending arm 332, which can also improve the aesthetics of the knob 33 at the same time.

In an embodiment, the height of the bottom of the extending arm 332 gradually decreases along the end of its tail end towards the rotation center of the knob 33 to form an inclined surface, so that the extending arm 332 can better avoid the protruding inclined surface 22, and the length of the extending arm 332 is retained as much as possible, thus the structure of the extending arm 332 is guaranteed to meet the use requirements.

Figure 3:
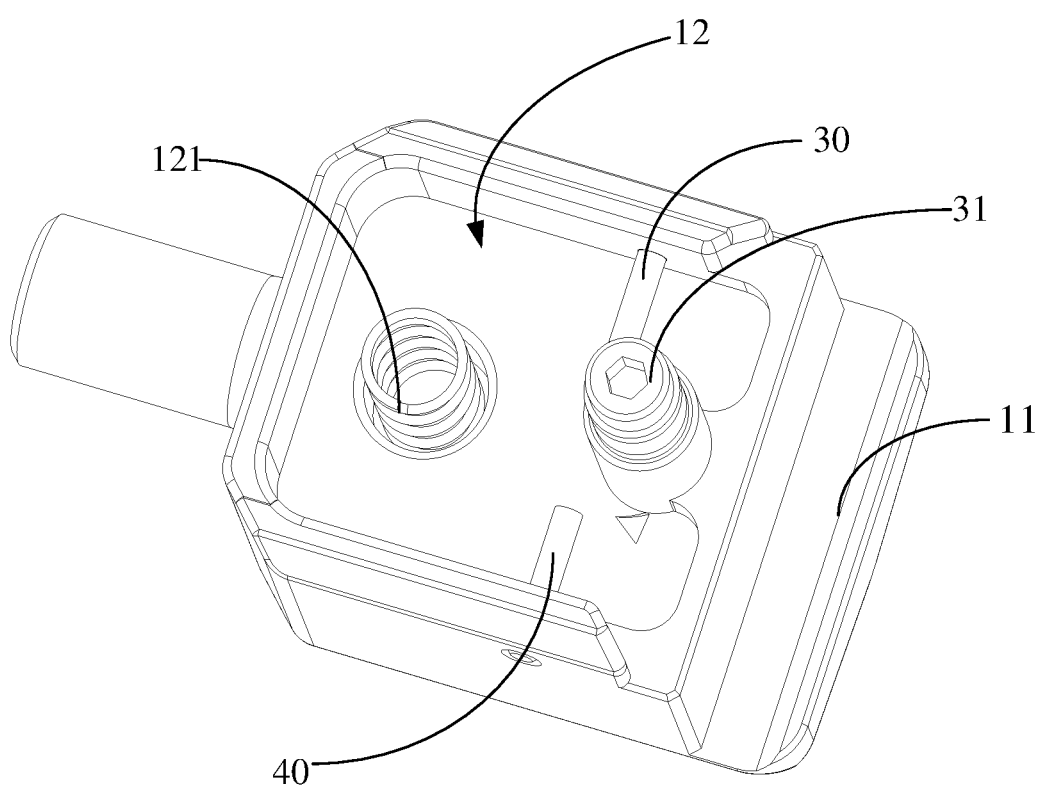
FIG. 3 is a schematic structural view of a seat according to an embodiment of the present application.

Further, referring to FIG. 1 to FIG. 3, in an embodiment, the pressing plate 20 is provided with a limiting baffle 24 configured to block the abutting arm 331 to limit the rotation of the knob 33, and the extending arm 332 is spaced apart from the limiting baffle 24 at height.

In this way, the knob 33 will be blocked by the limiting baffle 24 after one rotation, that is, the knob 33 can only rotate for a maximum of one rotation on the pressing plate 20 to avoid over-rotation of the knob 33.

In an embodiment, the position of the limiting baffle 24 on the pressing plate 20 is close to the lowest point of the protruding inclined surface 22. One side of the knob 33 is the limiting baffle 24, and the other side of the knob 33 is the lowest point of the protruding inclined surface 22. In this way, the knob 33 can completely contact the entire protruding inclined surface 22 through the unidirectional rotation, avoiding the limiting baffle 24 blocking the knob 33 on the protruding inclined surface 22, so that the knob 33 needs to rotate in two directions to be abutted against a higher point on the protruding inclined surface 22.

Further, referring to FIG. 6 to FIG. 9, in an embodiment, the pressing plate 20 is rotatably connected to the seat 10 through the rotation shaft 40, and the pressing plate 20 can be rotated along the rotation shaft 40 to drive the movable clamping portion 21 to rotate, thereby opening the clamping slot.

Figure 6:
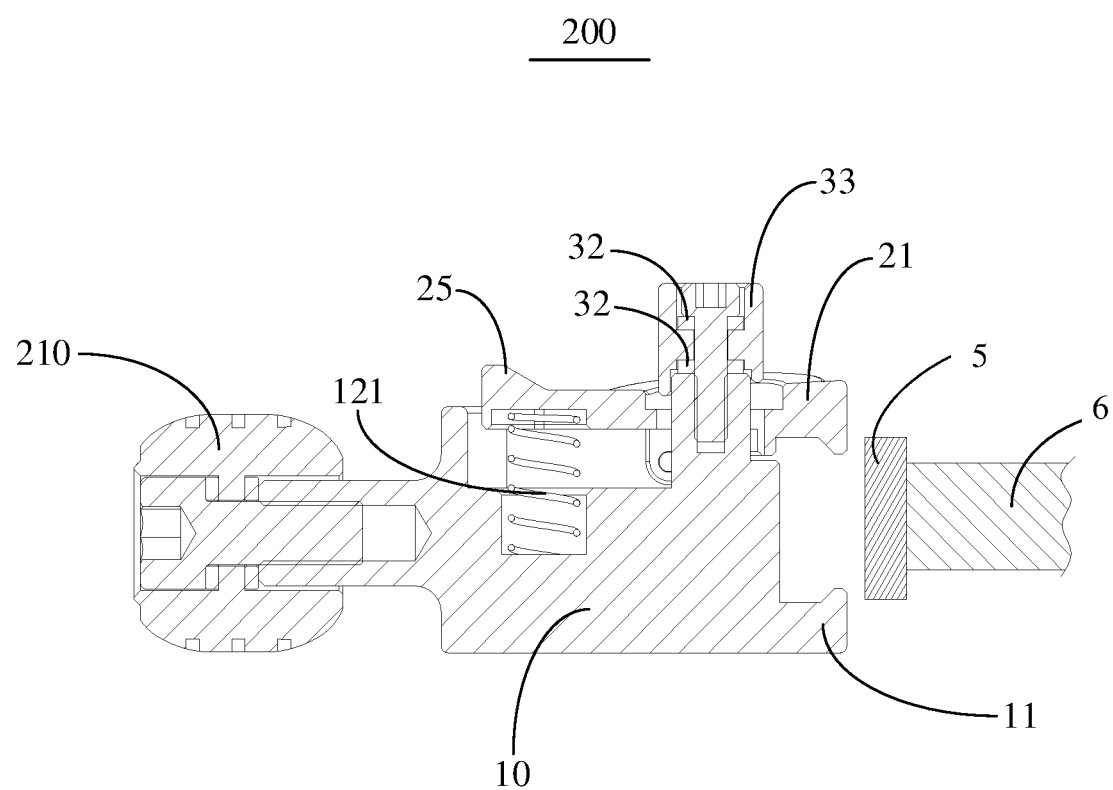
FIG. 6 is a schematic structural view of the photography kit according to an embodiment of the present application.
Figure 7:
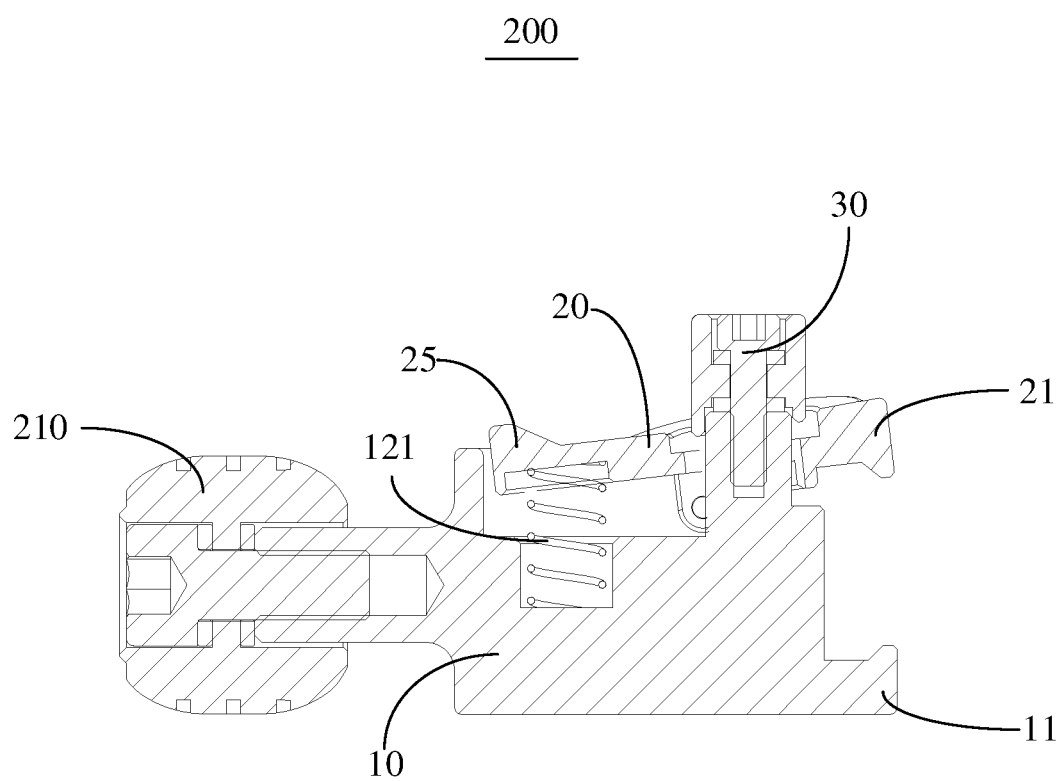
FIG. 7 is a schematic structural view of the photography kit according to an embodiment of the present application.
Figure 8:
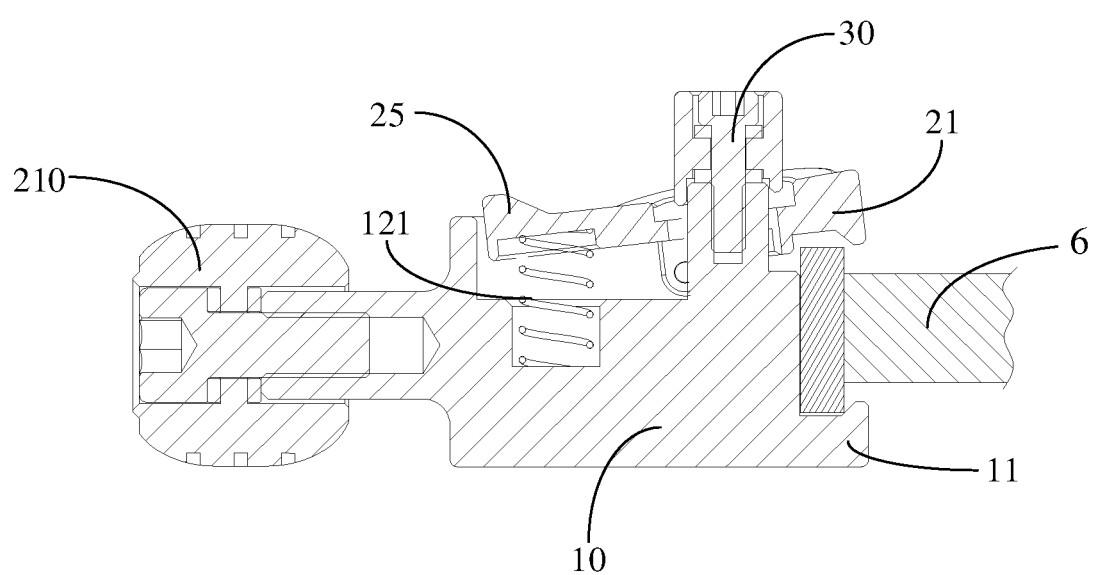
FIG. 8 is a schematic structural view of the photography kit according to an embodiment of the present application.
Figure 9:
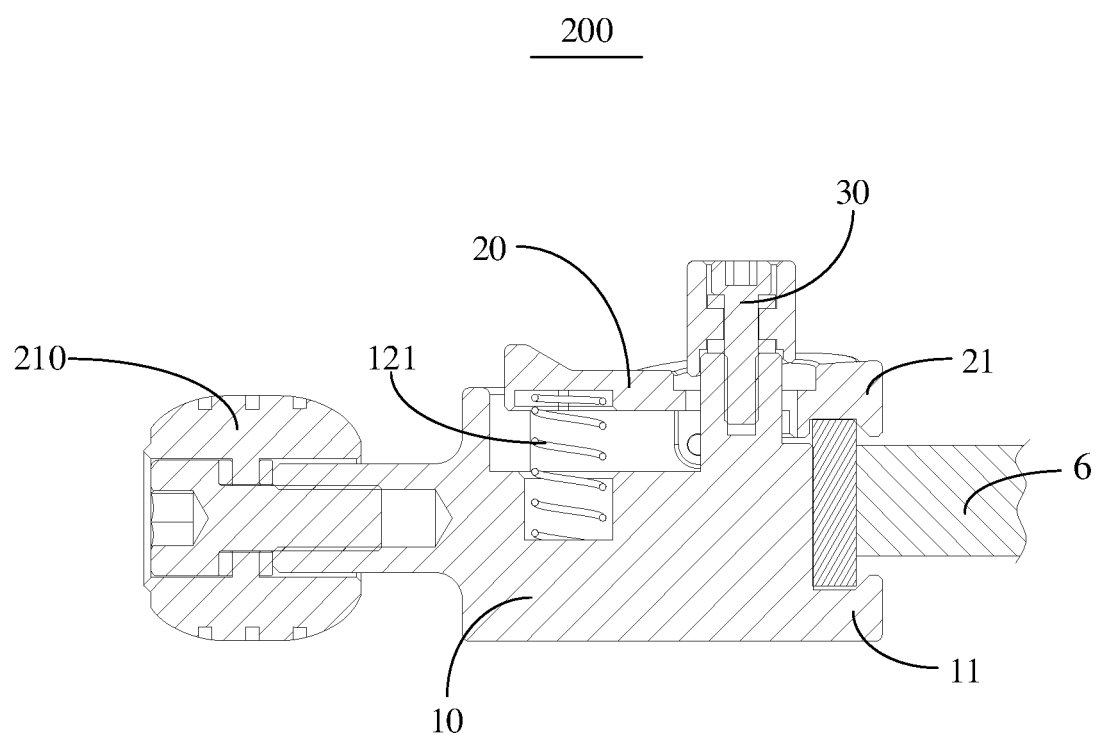
FIG. 9 is a schematic structural view of the photography kit according to an embodiment of the present application.

It should be understood that in order to realize the clamping and self-locking function of the clip 100, the pressing plate 20 needs to be rotated to open the clamping slot, and the clip 100 is locked by the rotation assembly 30 after the clamping is completed. As shown in FIG. 6, when the clip 100 is in the initial state, the clamping slot is not opened. As shown in FIG. 7 to FIG. 8, the first step of clamping is to press one end of the pressing plate 20 away from the movable clamping portion 21, so that one end of the pressing plate 20 close to the movable clamping portion 21 up-warps to fully open the clamping slot, and one edge of the mobile phone rabbit cage 5 is put in. As shown in FIG. 9, the second step is to return the pressing plate 20 to its original position, so that the clamping slot is closed again and clamp the edge of the mobile phone rabbit cage 5. In the last step, the rotation assembly 30 is rotated to abut against the protruding inclined surface 22, so that the rotation assembly 30 applies pressure to the pressing plate 20, and the pressing plate 20 moves towards the seat 10 to reduce the space of the clamping slot. In this way, the clamping slot can clamp the edge of the mobile phone rabbit cage 5, and at the same time, there is an interaction force between the rotation assembly 30 and the protruding inclined surface 22, and the static friction between the two is larger. The rotation assembly 30 will not easily slide from the abutting point, so as to clamp and lock the clip 100.

In this way, the pressing plate 20 is connected to the base plate through the rotation shaft 40, so that the pressing plate 20 can rotate around the rotation shaft 40 to make one end of the movable clamping portion 21 up-warp, and the clamping slot is opened, making it convenient to put in the mobile phone rabbit cage 5.

In an embodiment, in order to avoid that the pressure is too large to cause the rotation shaft 40 to break when the rotation assembly 30 rotates to apply pressure to the pressing plate 20, the rotation shaft 40 adopts the material with better rigidity, so that the rotation shaft 40 will not be prone to fracture even if it is bent frequently.

Further, referring to FIG. 3 and FIG. 6 to FIG. 9, in an embodiment, one side of the seat 10 close to the pressing plate 20 is provided with a cavity 12, and an elastic member is provided in the cavity 12. One end of the elastic member 121 is abutted against the seat 10, and the other end of the elastic member 121 is abutted against the pressing plate 20. The elastic member 121 and the movable clamping portion 21 are located on both sides of the rotation shaft 40.

In this way, the elastic member 121 is provided between the seat 10 and the pressing plate 20, and the elastic member 121 and the movable clamping portion 21 are provided on both sides of the rotation shaft 40, so that when one end of the movable clamping portion 21 up-warps, the pressing plate 20 will squeeze the elastic member 121. When the pressing plate 20 needs to be restored, the elastic member 121 will release elastic performance to rebound the pressing plate 20, and the elastic member 121 will also abut against the pressing plate 20, providing a force blocking the pressing plate 20 from up-warping, which avoids the misoperation that opens the clamping slot.

In an embodiment, in order to make the clip 100 cheaper to produce and to facilitate the replacement of the elastic member 121, the elastic member 121 is a spring.

Further, referring to FIG. 1 to FIG. 2 and FIG. 6 to FIG. 9, in an embodiment, a pressing structure 25 is provided on one side of the pressing plate 20 away from the seat 10, and the pressing structure 25 and the movable clamping portion 21 are respectively located on two sides of the rotation shaft 40.

In this way, the pressing structure 25 and the movable clamping portion 21 are located on both sides of rotation shaft 40, that is, the pressing structure 25 and the elastic member 121 are respectively located on the front and back of the pressing plate 20, so that when the user presses the pressing plate 20 to up-warp the pressing plate 20, the pressing structure 25 provides the user with a point of force, so as to avoid an occasion where the user does not press the pressing plate 20 hard and causes the slip of hands when the elastic member 121 rebounds too strongly.

In an embodiment, in order to make pressing structure 25 more suitable for habits of human use, an inclined surface is provided on the pressing structure 25, so that the user's finger can be placed on the inclined surface of the pressing structure 25. When the pressing plate 20 up-warps and the pressing structure 25 sinks into the seat 10, the inclined surface becomes a horizontal surface due to the rotation, and the fingers can exert force on this surface relatively easily to maintain the up-warping of the pressing plate 20.

Further, referring to FIG. 1 to FIG. 4, in an embodiment, two rotation shafts 40 are provided in the same straight line and relative to the two sides of the pressing plate 20.

In this way, two rotation shafts 40 are provided in the same straight line and relative to the two sides of the pressing plate 20, so that the length of the rotation shaft 40 is greatly reduced, which not only maintains the rotation and support function of the rotating shaft 40, but also avoids the situation where the rotating shaft 40 is easy to be squeezed and lead to fracture due to excessive length.

In an embodiment, in order to facilitate the installation of rotation shaft 40, the two sides of the pressing plate 20 are provided with hinged lugs. The two hinged lugs are first aligned with the inserting hole of the rotation shaft 40 on both sides on the seat 10, and two rotation shafts 40 are inserted respectively to connect to the seat 10 and the pressing plate 20.

Figure 10:
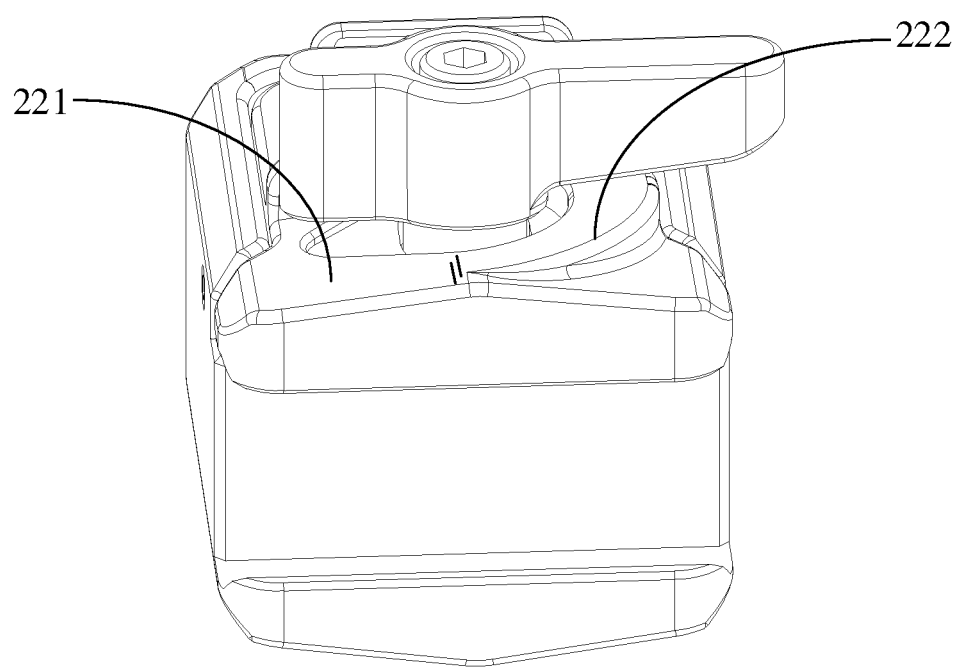
FIG. 10 is a schematic structural view of a protruding inclined surface according to an embodiment of the present application.
Figure 11:
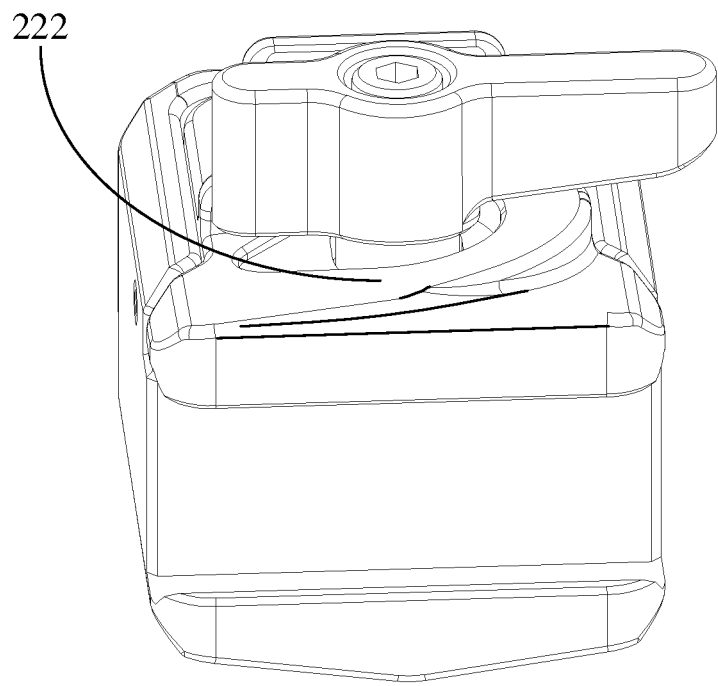
FIG. 11 is a schematic structural view of the protruding inclined surface according to an embodiment of the present application.
Figure 12:
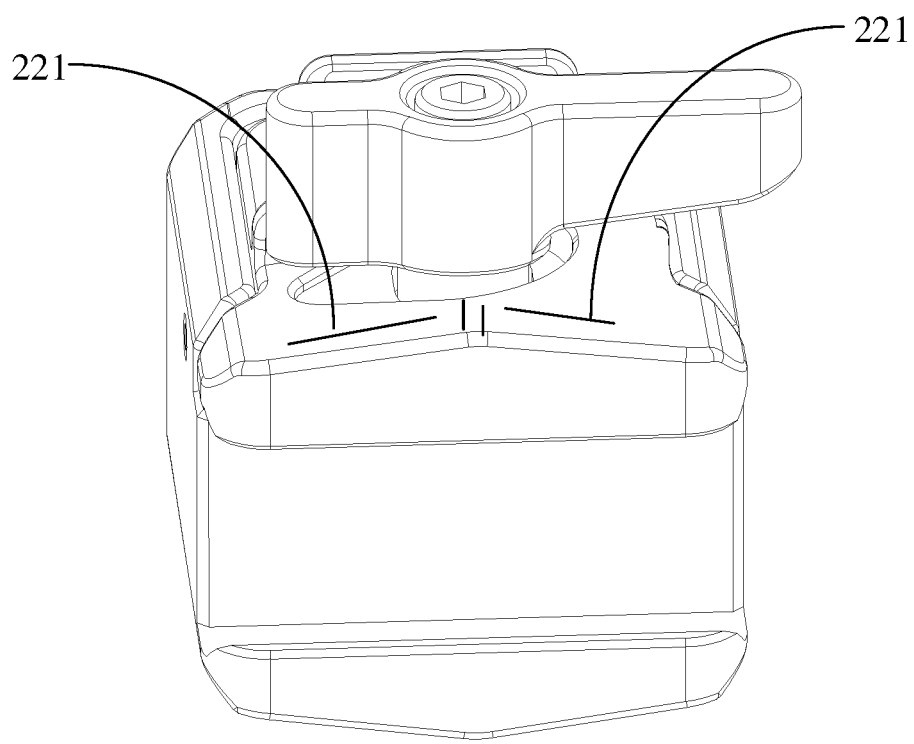
FIG. 12 is a schematic structural view of the protruding inclined surface according to an embodiment of the present application.

Further, referring to FIG. 10 to FIG. 12, in an embodiment, the protruding inclined surface 22 includes an inclined surface 221 and a spiral surface 222. The inclined surface 221 is a continuous straight inclined surface and has a lowest point and a highest point. The spiral surface 222 is a continuous arc inclined surface, and the lowest point of the spiral surface 222 is smoothly connected to the highest point of the inclined surface 221.

It should be understood that in this embodiment, the protruding inclined surface 22 includes the inclined surface 221 and the spiral surface 222, or the protruding inclined surface 22 can also have only one of the inclined surface 221 and the spiral surface 222.

In this way, the highest part of the inclined surface 221 is connected to the lowest part of the spiral surface 222, and the spiral surface 222 continues to be raised upwards by the inclined surface 221, which can increase the rotation formation of the knob 30. If an axial clearance of the knob 30 in the direction of the fixed column 31 appears due to use, and the height of the inclined surface 221 is not enough, it can continue to slide towards the spiral surface 222.

In an embodiment, the protruding inclined surface 22 is only provided with the spiral surface 222, and the spiral surface 222 is bounded by the long through hole 23. The rotation assembly 30 is abutted against the lowest point of the spiral surface 222, and the rotation assembly 30 can be abutted against the spiral surface 222 when rotating, so as to achieve the self-locking effect of the clip 100, so that the abutting of the rotation assembly 30 and the protruding inclined surface 22 is smoother, which makes it easier for the rotation assembly 30 to rotate.

In an embodiment, the protruding inclined surface 22 is only provided with the inclined surface 221, and the inclined surface 221 is provided with two segments. The highest points of the two segments of the inclined surface 221 are connected to form a triangular protrusion on the pressing plate 20, and the rotation assembly 30 can be abutted against the inclined surface 221 by rotation to achieve the self-locking effect of the clip 100, so that the inclined surface 221 is easier to form on the pressing plate 20, which is convenient for the production of the clip 100.

The present application also provides a photography kit 200, including a handle 210 and a clip 100, the specific structure of the clip 100 refers to the above-mentioned embodiments. Since the photography kit 200 adopts all the technical solutions of all the above-mentioned embodiments, it has at least all the beneficial effects brought by the technical solutions of the above-mentioned embodiments, which will not be repeated herein.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields, are included in the scope of the present application.

What is claimed is:

1. A clip, comprising:
    a seat, wherein one end of the seat is a fixed clamping portion;
    a pressing plate rotatably provided on the seat, wherein one end of the pressing plate is a movable clamping portion, the pressing plate is provided with a protruding inclined surface, the protruding inclined surface has a highest point and a lowest point, and a continuous inclined surface is provided between the lowest point and the highest point of the protruding inclined surface; and
    a rotation assembly configured to be abutted against the protruding inclined surface through rotation;
    wherein the fixed clamping portion is cooperated with the movable clamping portion to form a clamping slot, and the pressing plate is configured to rotate on the seat to open or close the clamping slot; in response to that the clamping slot is closed and the rotation assembly is abutted against the protruding inclined surface through rotation, the movable clamping portion is configured to move towards the fixed clamping portion, and the movable clamping portion is pressed to lock the clip.

2. The clip of claim 1, wherein the pressing plate is provided with a long through hole, a length of the long through hole extends towards the movable clamping portion, the rotation assembly is installed on the seat and passing through the long through hole, and a rotation axis of the pressing plate is perpendicular to an extension direction of the long through hole.

3. The clip of claim 2, wherein the rotation assembly comprises:
    a fixed column installed on the seat through the long through hole; and
    a knob, wherein an abutting arm is provided on a circumferential direction of the knob, and the knob is configured to rotate to make the abutting arm be abutted against the protruding inclined surface.

4. The clip of claim 3, wherein the rotation assembly further comprises two limiting members, the two limiting members are provided on the fixed column and are arranged at intervals, the knob is installed on the fixed column and is provided between the two limiting members, and each limiting member is an elastic pad.

5. The clip of claim 2, wherein a diameter of the long through hole is greater than a diameter of the fixed column.

6. The clip of claim 3, wherein an extending arm is provided on the circumferential direction of the knob, the extending arm is spaced apart from the abutting arm, and the extending arm is spaced apart from the protruding inclined surface at height.

7. The clip of claim 6, wherein the pressing plate is provided with a limiting baffle configured for blocking the abutting arm to limit a rotation of the knob.

8. The clip of claim 1, wherein the pressing plate is rotatably connected to the seat through a rotation shaft, and the pressing plate is configured to rotate along the rotation shaft to drive the movable clamping portion to rotate, so as to open or close the clamping slot.

9. The clip of claim 8, wherein one side of the seat close to the pressing plate is provided with a cavity, an elastic member is provided in the cavity, one end of the elastic member is abutted against the seat, the other end of the elastic member is abutted against the pressing plate, and the elastic member and the movable clamping portion are provided on two opposite ends of the rotation shaft.

10. The clip of claim 9, wherein one side of the pressing plate away from the seat is provided with a pressing structure, and the pressing structure and the movable clamping portion are respectively provided at the two opposite ends of the rotation shaft.

11. The clip of claim 8, wherein two rotation shafts are provided, and the two rotation shafts are in a same straight line and are arranged relative to two sides of the pressing plate.

12. The clip of claim 8, wherein the protruding inclined surface comprises:
   an inclined surface, wherein the inclined surface is a continuous straight inclined surface, and the inclined surface has a lowest point and a highest point; and
   a spiral surface, wherein the spiral surface is a continuous arc inclined surface, and a lowest point of the spiral surface is smoothly connected to the highest point of the inclined surface.

13. A photography kit, comprising a handle and the clip of claim 1, wherein the clip is installed on the handle.

\* \* \* \* \*